United States Patent [19]

Pinson

[11] Patent Number: 4,531,699
[45] Date of Patent: Jul. 30, 1985

[54] ACTIVE VIBRATION ISOLATOR
[75] Inventor: George T. Pinson, Huntsville, Ala.
[73] Assignee: The Boeing Company, Seattle, Wash.
[21] Appl. No.: 398,673
[22] Filed: Jul. 15, 1982
[51] Int. Cl.³ .............................................. F16M 13/00
[52] U.S. Cl. ..................................................... 248/550
[58] Field of Search ....................... 248/550, 624, 602; 74/5.5; 267/136; 188/379

[56] References Cited

U.S. PATENT DOCUMENTS

| | | | |
|---|---|---|---|
| 2,661,188 | 12/1953 | Smoot | 248/624 |
| 2,964,272 | 12/1960 | Olson | 248/550 |
| 3,000,600 | 9/1961 | Suozzo | 248/624 |
| 3,216,679 | 11/1965 | Curwen | 248/550 |
| 3,464,657 | 9/1969 | Bullard | 248/550 |
| 3,606,233 | 9/1971 | Scharton et al. | 248/550 |
| 3,952,979 | 4/1976 | Hansen | 248/550 |
| 4,033,541 | 7/1977 | Malueg | 248/550 |
| 4,351,515 | 9/1982 | Yoshida | 267/136 |
| 4,363,377 | 12/1982 | Van Gerpen | 248/550 |

Primary Examiner—Ramon S. Britts
Assistant Examiner—Ramon O. Ramirez
Attorney, Agent, or Firm—Edwin H. Crabtree

[57] ABSTRACT

An active vibration isolator for removing vibration between a vibration source and a payload. The payload being various types of equipment such as measuring instruments, a camera, a vehicle seat, weaponry and other types of devices whose performance is sensitive to vibration. The isolator suspending the payload from a coil spring attached to the vibration source. A solenoid is mounted between the spring and the payload and an electrical control system is used to control the solenoid so the solenoid moves in an equal but opposite direction to the vibration on the spring thereby stablizing the payload.

5 Claims, 8 Drawing Figures

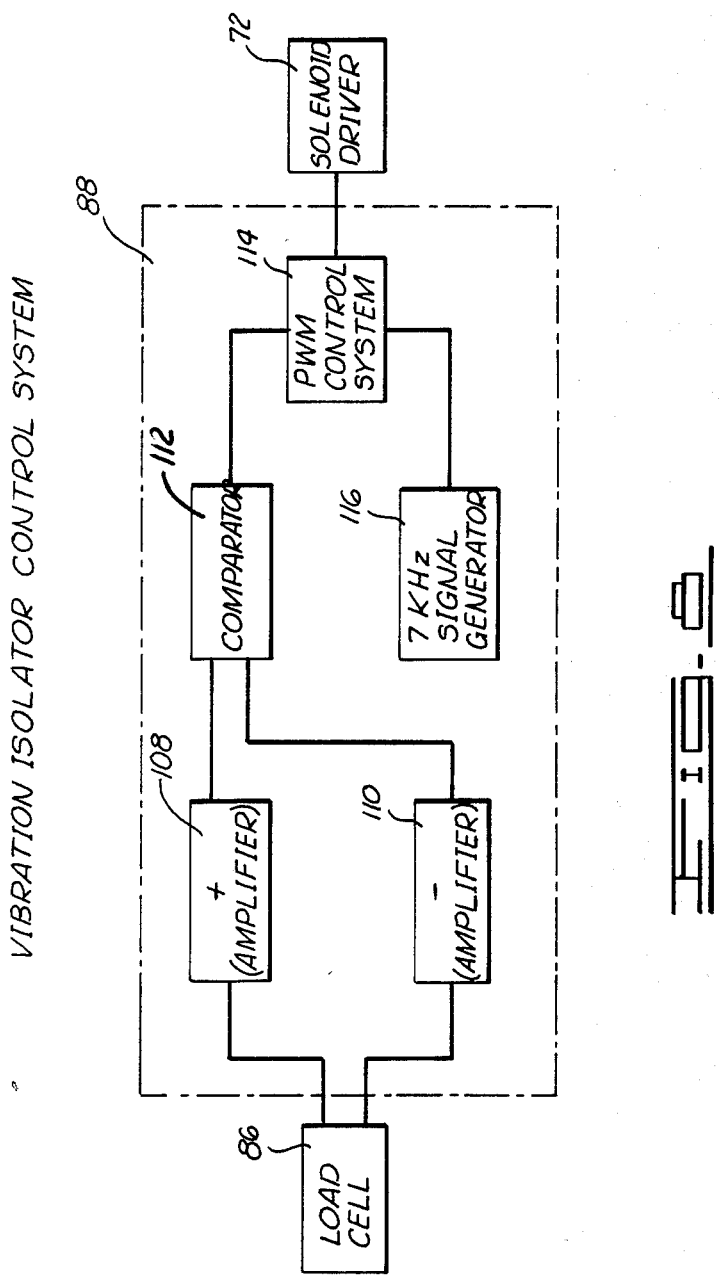

ACTIVE VIBRATION ISOLATOR

BACKGROUND OF THE INVENTION

This invention relates to a vibration isolator and more particularly but not by way of limitation to an active vibration isolator used in conjunction with a spring biasing means and a solenoid with a control system to operate the solenoid so the solenoid shaft moves in an equal but opposite direction to the vibration placed on the spring.

Heretofore, in a dynamic environment such as encountered by an aircraft, payload stablization requires the removal of the vehicle dynamics in the form of pitch, yaw and roll and the effects of vibration along each of these axis. In a non-vibrational dynamic environment, it is difficult to stablize a payload because of the lag in the measurement, control, and stablization of the system. This is caused by the time required for a sensor such as an accelerometer to measure a force or movement, the control system to interpret the movement or force, and the time required for some stablization system such as a torquer to react to the commands issued by the control system.

In the real world the ability of a control system with its train of measurements and action devices to control unexpected movement is degraded by vibration in the pitch, yaw and roll direction. These vibrations and unexpected impulses are caused by wind gusts, engine operation and other external and internal sources. Some vibration and impulses are eliminated by the use of shock mounts or other passive devices. The remaining vibrations which can only be partially eliminated by the control system must be tolerated by the payload.

In U.S. Pat. No. 2,964,272 to Olson, U.S. Pat. No. 3,216,679 to Curwen, U.S. Pat. No. 3,464,657 to Bullard, U.S. Pat. No. 3,606,233 to Schraton et al, U.S. Pat. No. 3,952,979 to Hansen and U.S. Pat. No. 4,033,541 to Malueg various types of active and passive vibration isolators are shown for supporting different types of equipment for isolating different types of vibration. None of these vibration isolators specifically disclose the unique feature of the subject active vibration isolator which in real time will remove vibrations, impulses and other low level pitch, yaw and roll motions before they are transferred to the payload.

SUMMARY OF THE INVENTION

The subject invention actively removes vibrations before they are transmitted to the payload. The isolator responds at an equal rate to the frequency and amplitude of the vibration input.

The isolator also eliminates the problem of passive isolators which are unable to remove vibration having a frequency below 100 Hz.

The active vibration isolator is simple in design and is readily adaptable for different types and sizes of payloads subject to vibration. The isolator actively removes vibration impulses and other low level pitch, yaw and roll motions before they are transferred to the payload.

The active vibration isolator for removing vibration between a vibration source and a payload includes a coil spring adapted for attachment to the vibration source. A solenoid is disposed adjacent the spring and is adapted for attachment to the vibration source. The solenoid includes a solenoid shaft extending outwardly therefrom for attachment of the payload thereon. A force gage is mounted between the solenoid shaft and the payload and is responsive to the movement of the solenoid shaft. The gage is under compression and is alternately squeezed and relieved from this biased position. An electrical control system is connected to the solenoid and the force gage for measuring the amount of movement on the force gage and energizing the solenoid to maintain a constant force on the force gage thereby stabilizing the payload.

The advantages and objects of the invention will become evident from the following detailed description of the drawings when read in connection with the accompanying drawings which illustrate a preferred embodiment of the invention.

BRIEF DESCRIPTION OF THE DRAWINGS

FIG. 8 illustrates a flow diagram of the vibration isolator's control system.

DETAILED DESCRIPTION OF THE DRAWINGS

Figure 1:
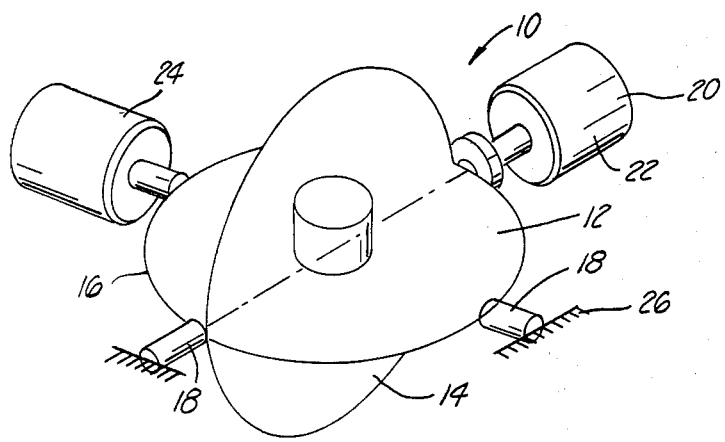
FIG. 1 is a prior art two-gimbal stablization system.

In FIG. 1 a typical two-gimbal stablization system is shown and designated by general reference numeral 10. The system 10 includes a sensor platform 12 attached to an X gimbal ring 14 which may be an integral part of the sensor platform 12. The X gimbal ring 14 is attached to a Y gimbal ring 16 through a set of bearings 18. An X gimbal drive 20 consists of a torquer 22 or digital stepping motor and is attached to the Y gimbal ring 16. A Y gimbal drive 24 and a Y gimbal support 26 are attached to a fixed structure. The fixed structure is not shown in the drawings. Typically a set of gyros or rate sensors sense a motion in the fixed structure. This information is transmitted to a control system. The control system determines the amount of motion required in the X and Y gimbals and commands the appropriate amount of motion.

Under the conditions that the sensor platform and its payload have a small mass and a low inertia relative to the power of the gimbal drives, the sensor platforms can nominally be moved at a rate of 10 to 20 Hz. or slightly larger depending on the design. If the mass or inertia is large, the drive system must be carefully designed if an acceptable response rate is to be obtained. In general, the system 10 can move small lightweight objects rapidly and large heavy objects slowly.

The two gimbal stablization system 10 described under FIG. 1 although different in appearance from azimuth, elevation, X, Y and polar mount designs, suffers from a common design problem. This problem occurs when the object to be stablized is subject to vibration with a frequency higher than the response capabilities of the gimbal system. None of these systems work when extremely high stablization is required during a time period when the gimbal system is subject to vibration. The basic design problem is to remove the vibration before it gets into a pointer/tracker system.

None of the prior art vibration isolators have solved this problem. Also these systems tolerate a level of noise on the stablization platform.

Figure 2:
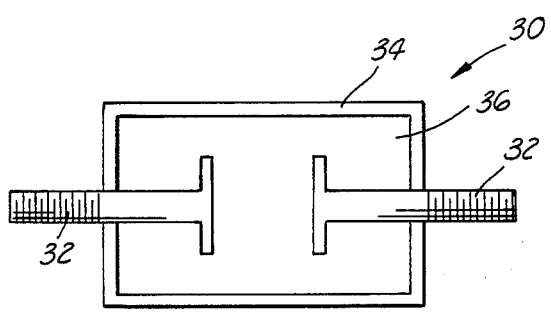
FIG. 2 is a prior art passive vibration isolator.

The only method identified in use to remove vibration between a source and a payload is the use of a passive vibration isolator device. A typical prior art passive vibration isolator is shown in FIG. 2. The passive vibration isolator is designated by general reference numeral 30.

Figure 3:
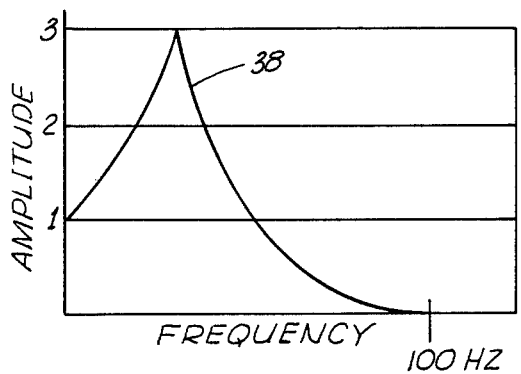
FIG. 3 illustrates the typical frequency response of the passive isolator shown in FIG. 2.

The isolator 30 illustrated in FIG. 2 consists of mounting studs 32 enclosed within a shell 34 which is in turn filled with a flexible material 36. The stiffness of the flexible material 36 is a function of the vibration frequencies to be removed. Typically the frequency response of such an isolator as shown consists of nearly complete removal of vibration above a certain frequency followed by a resonance at some frequency. This is illustrated in FIG. 3. The problem usually encountered is the passive isolator 30 is unable to remove frequencies below 100 Hz. as shown by curve 38. A spring system and shock absorbers have also been used to remove the effects of low frequency vibration with varying degrees of success.

Figure 4:
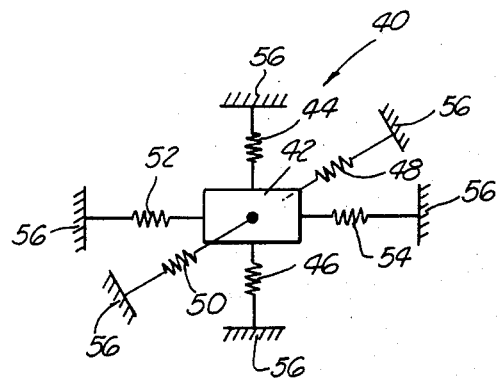
FIG. 4 illustrates a simplistic view of the subject active vibration isolator.

In FIG. 4 a simplistic illustration of the subject active vibration isolator is shown and designated by general reference numeral 40. The isolator 40 removes vibrations before they are transmitted to the payload. The basic concept is illustrated wherein a mass or payload 42 is suspended in space by an orthogonal set of springs 44, 46, 48, 50, 52 and 54. Each of these springs is attached to a restraining wall 56. If one of the walls 56 is allowed to move, then the spring attached between the payload 42 and the wall 56 will exert a force on the payload 42. This force causes the mass to move. If, as illustrated in FIG. 4, a force is applied to spring 46 by pulling the wall 56 away from the mass 42 and at the same time the stiffness of the spring 44 is increased to compensate for this increased pull by the spring 46, no net force is transmitted to the mass. In general, if a method is devised where the sum of the forces acting on the mass of payload 42 can be constant, then the mass is isolated in a quasi-inertial frame of reference. In simplistic terms, the vibration has been removed.

If the softness or stiffness of these springs can be changed at the same frequency of the vibration then no net forces will be transmitted to the payload. This would permit complete stablization of the mass to take place. A pointer/tracker which can be a part of the mass can then perform the function of target tracking by removing large scale motion at frequencies which occur within its control range without the necessity of removing or living with vibration.

The above concept can be implemented in a number of different ways depending on the ingenuity of the designer. However, any active vibration isolator 40 must be able to respond at a rate equal to the frequency and amplitude of the vibration of the vibration input.

Figure 5:
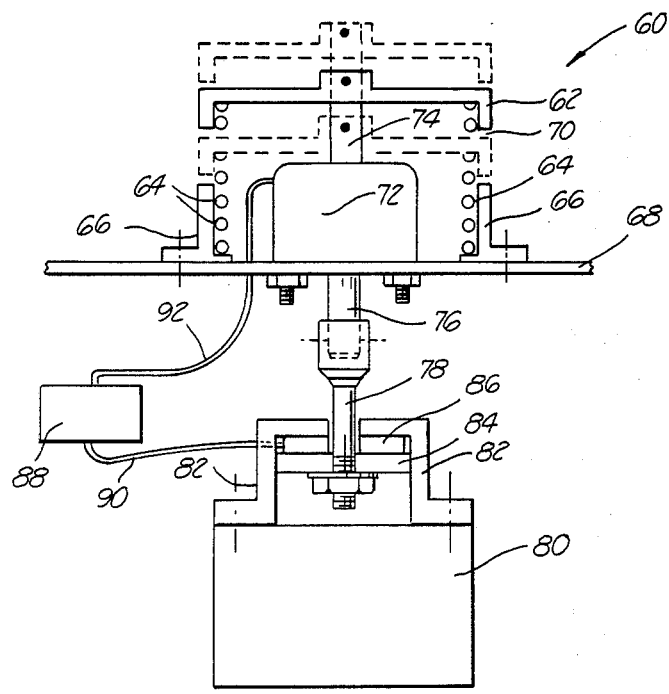
FIG. 5 illustrates a front view of the active vibration isolator.

In FIG. 5 one embodiment of the active vibration isolator is shown and designated by general reference numeral 60. The isolator 60 includes a housing 62 which is attached to a coil spring 64 mounted on a mounting plate 66. The mounting plate 66 is secured to a vehicle 68 which is subject to a vibration source. It should be noted a gap 70 is provided between the housing 62 and the mounting plate 66 to provide for movement of the housing 62 shown in dotted lines in its maximum allowable movement in an up and down position. The housing 62 is also attached to the top of a solenoid driver 72 by a connecting arm 74. The solenoid driver 72 also includes a solenoid shaft 76 extending downwardly therefrom and secured to a payload attachment shaft 78. A payload 80 is secured to the payload attachment shaft 78 by brackets 82. Disposed between the brackets 82 and an attachment ring 84 is a force gage load cell 86 or a displacement sensor which is electrically connected to a control system 88 by an electrical lead 90. The control system 88 is also electrically connected to the solenoid driver 72 by an electrical lead 92.

The spring 64 is capable of supporting the payload 80 under static conditions with the spring 64 disposed within the housing 62. The spring 64 is selected so that the gap 70 is larger than the maximum excursion of the vibration from the vehicle 68.

In operation the vibration input from the vehicle 68 is transmitted through the shaft 76 to the payload 80 causing the payload 80 to vibrate at the same frequency and amplitude as the vibration input. When the active vibration isolator 60 is energized, the load cell 86 is alternately squeezed and relieved by the motion of the payload 80. The load cell 86 is the type used in wind tunnel work and is a typical force sensor. These sensors are piezoelectric devices which provide an output voltage when alternate forces are placed on the load cell 86.

The control system 88 is designed so when compression or tension is placed on the load cell 86, the control system 88 energizes the solenoid driver 72 to maintain a constant force on the load cell 84. The solenoid driver 72 is permitted to move at the same rate as the vibration of the vehicle 68 while the solenoid shaft 76 is caused to move at the same rate, amplitude and frequency as the vehicle vibration. Any displacement of the payload 80 will result in the immediate compensating displacement in the solenoid shaft 76. This operation stablizes the payload 80 to a high level of accuracy.

Figures 6, 7:
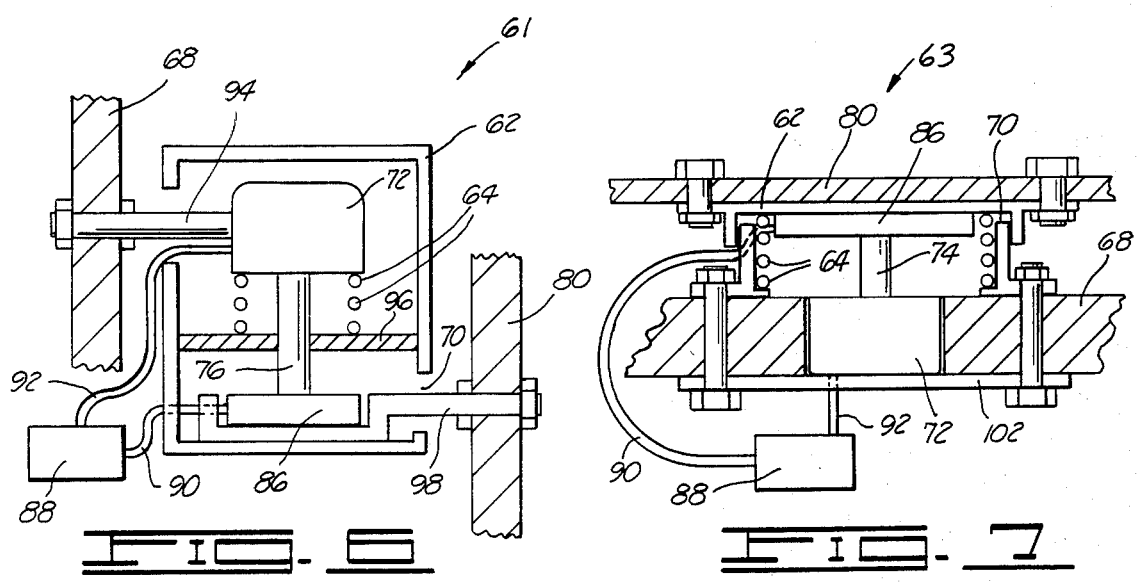
FIGS. 6 and 7 illustrate alternate embodiments of the active vibration isolator shown in FIG. 5.

In FIG. 6 an alternate embodiment of the active vibration isolator 61 is shown wherein it is side mounted on a vibration source from the vehicle 68 mounted vertically. The vehicle 68 is attached to the solenoid 72 by a vehicle attachment shaft 94. In this illustration the coil spring 64 is disposed between the solenoid 72 and a support plate 96 which is attached to the sides of the housing 62. Also in this example, the solenoid shaft 76 is attached directly to the load cell 86 which is mounted on top of a payload attachment shaft 98. The shaft 98 is mounted horizontally to the vertically disposed payload 80. Again, the load cell 86 is electrically connected to the control system 88. The control system 88 is connected to the solenoid 72 and load cell 86 by the electrical leads 90 and 92.

In FIG. 7 a bottom mount of the active vibration isolator 63 is shown wherein the payload 80 is mounted above the vibration source from the vehicle 68. The solenoid 72 is attached to the vehicle 68 by a mounting plate 102 with the coil spring 64 secured inside the housing 62 with the load cell 86 disposed between the solenoid shaft 76 and the payload 80.

In the review of the FIGS. 6 and 7, it should be noted the vibration from the vehicle 68 can occur in different planes and the isolator can be mounted in various configurations and operate as described in FIG. 5.

In FIG. 8 the vibration isolator control system 88 is shown, wherein when a force is exerted on the load cell 86, a signal generated by the load cell is sent to amplifiers 108 and 110 where the signal is amplified. This amplified signal is then sent to an additional amplifier and again to yet another amplifier. These additional amplifiers are not shown in FIG. 8 but are considered to be part of 108 and 110. This amplified signal then goes to a comparator 112, which decides if it is positive or negative. The resultant signal is fed to PWM control system 114. The PWM control system 114 is a standard pulse width modulation control system for controlling the signal in an on or off time domain command period. A signal generator chip that emits 7 KHz compares the PWM signal. The output is fed to two transistors (not shown in FIG. 8) which acts as a switch. The output of the switch goes to the solenoid driver 72 which responds to counteract the vibration impact. When the force exerted on the load cell 86 is zero, the controlled mass is stationary.

Changes may be made in the construction and arrangement of the parts or elements of the embodiments as described herein without departing from the spirit or scope of the invention defined in the following claims.

What is claimed is:

1. An active vibration isolator for removing vibration between a vibration source and a payload, the isolator comprising:

a spring biasing means adapted for attachment to the vibration's source and held in compression thereagainst;

a solenoid disposed adjacent the spring biasing means and adapted for attachment to the vibration source, the solenoid having a solenoid shaft and extending outwardly therefrom, the solenoid shaft in line with the payload and vibration source, the payload suspended on the solenoid shaft and supported by the spring biasing means;

means for attaching the payload to the solenoid shaft;

a force gauge mounted on the means for attaching the payload and responsive to the movement of the solenoid shaft; and a control system electrically connected to the solenoid and the force gauge for measuring the amount of vibration force placed on the force gauge and energizing the solenoid to maintain a constant force on the force gauge thereby stabilizing the payload.

2. The isolator as described in claim 1 wherein the spring biasing means is a coil spring adapted for attachment to the vibration source.

3. The isolator as described in claim 2 further including a spring housing adapted for attachment to the vibration source and surrounding the coil spring.

4. The isolator as described in claim 1 wherein the means for attaching the payload to the solenoid shaft is a payload attachment shaft secured to the end of the solenoid shaft, the payload attachment shaft connected to a payload mounting bracket, the bracket secured to the payload.

5. An active vibration isolator for removing vibration between a vibration source and a payload, the isolator comprising:

a coil spring adapted for attachment to the vibration source and held in compression thereagainst;

a spring housing surrounding the coil spring;

a solenoid disposed inside the coil spring and adapted for attachment to the vibration source, the solenoid having a solenoid shaft extending outwardly therefrom, the solenoid shaft in line with the payload and vibration source, the payload suspended on the solenoid shaft and supported by the coil spring;

means for attaching the payload to the solenoid shaft;

a force gauge mounted on the means for attaching the payload and responsive to the movement of the solenoid shaft; and a control system electrically connected to the solenoid and the force gauge for measuring the amount of vibration force placed on the force gauge and energizing the solenoid to maintain a constant force on the force gauge thereby stabilizing the payload.

* * * * *